(12) United States Patent
Anfray et al.

(10) Patent No.: US 11,298,661 B2
(45) Date of Patent: Apr. 12, 2022

(54) CLEANING METHOD OF A WATER-FILTRATION SYSTEM UNDER OPERATION

(71) Applicants: TOTAL SA, Courbevoie (FR); VEOLIA WATER SOLUTIONS & TECHNOLOGIES SUPPORT, Saint Maurice (FR); SAIPEM S.A., Montigny le Bretonneux (FR)

(72) Inventors: Jérôme Anfray, Pau (FR); Pierre Pedenaud, Lescar (FR); Graeme Skivington, Glasgow (GB); Thomas Delaplace, Clichy (FR)

(73) Assignees: TOTAL SA, Courbevoie (FR); VEOLIA WATER SOLUTIONS TECHNOLOGIES SUPPORT, Saint Maurice Cédex (FR); SAIPEM S.A., Montigny le Bretonneux (FR)

( * ) Notice: Subject to any disclaimer, the term of this patent is extended or adjusted under 35 U.S.C. 154(b) by 295 days.

(21) Appl. No.: 16/314,571

(22) PCT Filed: Jul. 1, 2016

(86) PCT No.: PCT/IB2016/001157
§ 371 (c)(1),
(2) Date: Dec. 31, 2018

(87) PCT Pub. No.: WO2018/002685
PCT Pub. Date: Jan. 4, 2018

(65) Prior Publication Data
US 2019/0168166 A1 Jun. 6, 2019

(51) Int. Cl.
*B01D 65/02* (2006.01)
*B01D 65/08* (2006.01)
(Continued)

(52) U.S. Cl.
CPC .............. *B01D 65/02* (2013.01); *B01D 61/04* (2013.01); *B01D 61/16* (2013.01); *B01D 65/08* (2013.01);
(Continued)

(58) Field of Classification Search
CPC ........ B01D 61/04; B01D 61/16; B01D 65/02; B01D 65/08; B01D 2311/06;
(Continued)

(56) References Cited

U.S. PATENT DOCUMENTS 4,243,523 A 1/1981 Pelmulder
6,074,551 A 6/2000 Jones et al.
(Continued)

FOREIGN PATENT DOCUMENTS

AU 2008202302 A1 * 12/2009 .............. C02F 1/441
DE 10 2013 113641 A1 6/2015
(Continued)

OTHER PUBLICATIONS

PCT International Search Report for PCT/IB2016/001157 dated Feb. 21, 2017, 4 pages.
(Continued)

*Primary Examiner* — Hayden Brewster
(74) *Attorney, Agent, or Firm* — Patterson Thuente Pedersen, P.A.

(57) ABSTRACT

The present invention is a filtration system and a method for cleaning a filtration system. The filtration system comprising a hydraulic circuit Cp recycling the permeate stream to the feed side of the membrane and/or a hydraulic circuit Cr recycling the retentate stream to the feed side of said membrane. The method injects an amount of a chemical product into the filtration system in the hydraulic circuit Cp or in the hydraulic circuit Cr or upstream of the cross-flow filtration membrane, setting the proportion of recycled per-
(Continued)

meate stream or recycled retentate stream collected in the hydraulic circuit Cp and/or Cr to enable the recycling of a significant amount of unreacted chemical product having passed through the cross-flow filtration membrane to the feed side of said cross-flow filtration membrane.

6 Claims, 1 Drawing Sheet

(51) Int. Cl.
    *C02F 1/44*     (2006.01)
    *B01D 61/16*     (2006.01)
    *B01D 61/04*     (2006.01)

(52) U.S. Cl.
    CPC .............. *C02F 1/441* (2013.01); *C02F 1/442* (2013.01); *C02F 1/444* (2013.01); *B01D 2311/06* (2013.01); *B01D 2311/08* (2013.01); *B01D 2311/12* (2013.01); *B01D 2311/24* (2013.01); *B01D 2311/25* (2013.01); *B01D 2315/06* (2013.01); *B01D 2315/10* (2013.01); *B01D 2321/16* (2013.01); *B01D 2321/162* (2013.01); *B01D 2321/164* (2013.01); *B01D 2321/168* (2013.01); *B01D 2321/205* (2013.01); *B01D 2321/40* (2013.01)

(58) Field of Classification Search
    CPC ............ B01D 2311/08; B01D 2311/12; B01D 2311/24; B01D 2311/25; B01D 2315/06; B01D 2315/10; B01D 2321/40; B01D 2321/16; B01D 2321/162; B01D 2321/164; B01D 2321/168; B01D 2321/205; C02F 1/441; C02F 1/442; C02F 2/444
See application file for complete search history.

(56) References Cited

U.S. PATENT DOCUMENTS

| | | | |
|---|---|---|---|
| 2003/0034292 A1* | 2/2003 | Rela ........................ | C02F 1/441 210/321.6 |
| 2004/0018583 A1* | 1/2004 | Ho ......................... | B01D 61/12 435/34 |
| 2006/0096920 A1 | 5/2006 | Ayala et al. | |
| 2015/0231533 A1* | 8/2015 | Riviere .................. | C02F 1/442 210/797 |

FOREIGN PATENT DOCUMENTS

| | | | | |
|---|---|---|---|---|
| EP | 0599281 A2 * | 6/1994 | ............. | C02F 1/441 |
| EP | 2 897 714 A1 | 7/2015 | | |
| WO | WO 2006/134367 A1 | 12/2006 | | |
| WO | WO-2009122134 A1 * | 10/2009 | ............ | B01D 61/12 |
| WO | WO 2011/051666 A1 | 5/2011 | | |
| WO | WO 2014/044976 A1 | 3/2014 | | |
| WO | WO 2014/044978 A1 | 3/2014 | | |

OTHER PUBLICATIONS

PCT Written Opinion of the ISA for PCT/IB2016/001157 dated Feb. 21, 2017, 11 pages.

Matin, Asif, et al., "Biofouling in reverse osmosis membranes for seawater desalination: Phenomena and prevention", Desalination 281, 2011, pp. 1-16.

Al-Amoudi, Ahmed S., et al., "Performance restoration and autopsy of NF membranes used in seawater pretreatment", Desalination 178, 2005, pp. 261-271.

* cited by examiner

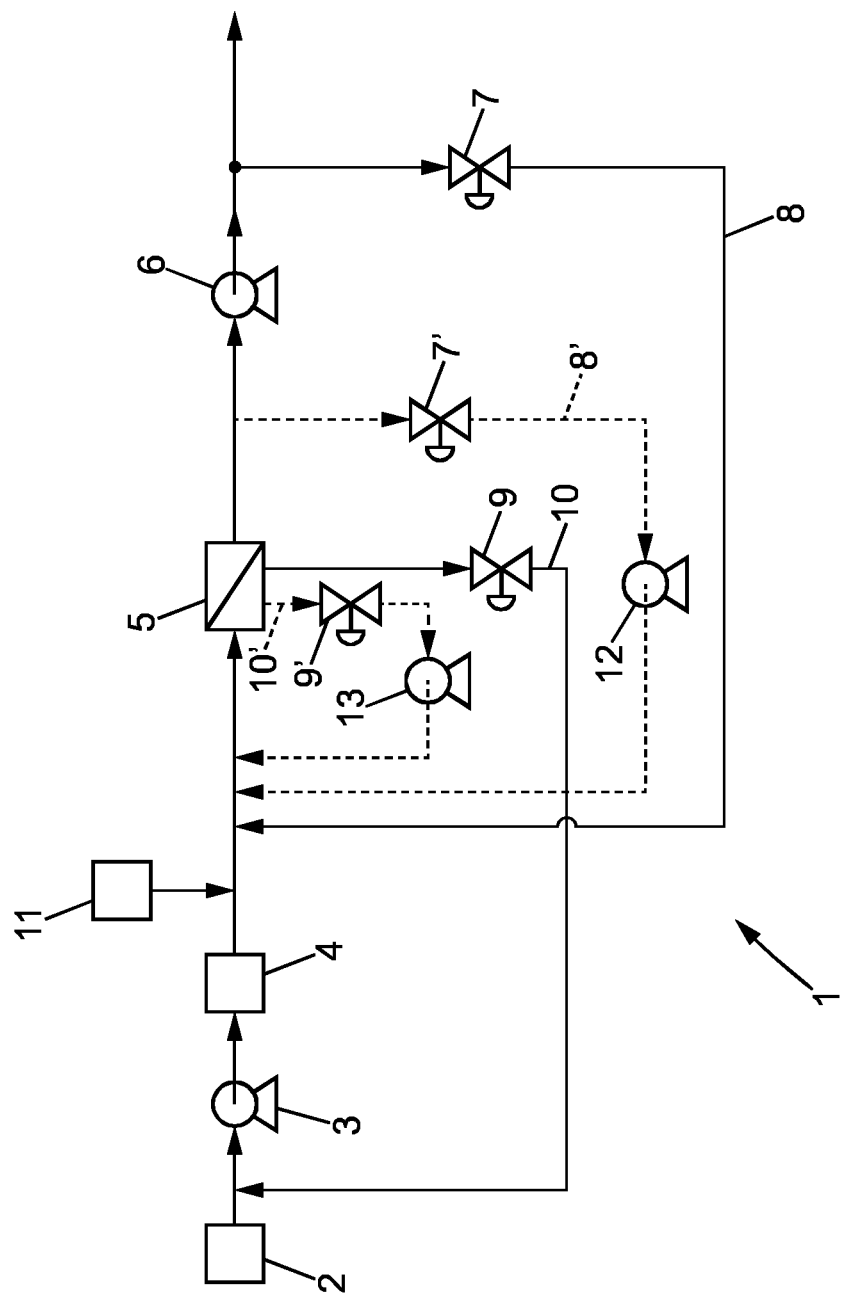

CLEANING METHOD OF A WATER-FILTRATION SYSTEM UNDER OPERATION

RELATED APPLICATIONS

The present application is a National Phase entry of PCT Application No. PCT/IB2016/001157, filed Jul. 1, 2016, said application being hereby incorporated by reference herein in its entirety.

FIELD OF THE INVENTION

The present invention is in the field of water treatment and in particular in the field of filtration systems for producing low salinity water which is in particular suitable for injection in a subterranean hydrocarbon formation. More particularly, the present invention relates to a method for cleaning a water filtration system whilst in operation, said filtration system comprising a cross-flow filtration membrane. The subject matter of the present invention also concerns the filtration system for carrying out said method.

BACKGROUND OF THE INVENTION

The injection of water into hydrocarbon fields is a well-known technique in the oil and gas industry which consists in injecting some water, commonly known as "injection water", into an oil and gas reservoir through an injection well. This operation enables the recovery of hydrocarbons by maintaining the pressure in the reservoir and by sweeping the oil in situ.

The production of injection water will generally depend on the availability of water, and on other constraints, around the site of the hydrocarbon extraction. For example, in the case of offshore extraction, seawater will commonly be used as feedstock for the production of injection water. However, treatment steps are essential in order to obtain injection water that is compatible with the water of the formation. Indeed, the formation water can contain ions such as barium, calcium or strontium ions, which are generally present in the form of soluble salt, and as seawater generally contains precipitate precursors such as soluble carbonate and sulfate, the mixing of the formation water with untreated seawater may cause the precipitation of various salts such as barium sulfate for example. This precipitation will generally lead to scale formation not only within the formation but also in the production well, in the flow lines or in the separators. Furthermore, the presence of sulfates within the formation will favor the development of bacteria generating $H_2S$ which is corrosive and will cause corrosion of the pipes. In order to obtain low salinity water that is compatible with the formation water, seawater or any other high salinity water, thus require a treatment that enables the removal of ions such as sulfate, magnesium or carbonate ions.

Cross-flow filtration systems (also called tangential filtration systems) are commonly used to remove such types of ions from water. In these systems, the feed flow travels tangentially across the surface of the filter rather than into the filter (hence the term "cross-flow"). The advantage of such filtration systems is that the filter cake which would clog the filter up is substantially washed away during the filtration process, thereby increasing the working life of the filter.

Cross-filter filtration systems include for instance nanofiltration membranes and reverse osmosis membranes. Nanofiltration membranes are typically used to remove divalent ions from water, such as sulfates, but they also retain small amount of monovalent ions. Reverse osmosis membranes can be used to remove any ions from water.

Generally, these water treatment units are placed close to the hydrocarbon field. In the case of underwater fields, said units are either installed on the surface of the same offshore platforms which extract the hydrocarbons or on attached floating platforms, currently called FPSO units ("Floating Production, Storage and Offloading") or are placed under water on the seabed.

However, the exploitation of new fields which are located at ever greater depths (i.e. depths ranging from 500 and 1,500 meters or even ultra-great depths i.e. deeper than 1,500 meters) engages the development of new ways to extend the working lives of filters to limit the need to bring the filtration systems to the surface for cleaning.

Some means enabling the cleaning or the reduction of the clogging over time of the filtration membranes placed under water are known in the field.

For example, it is known to provide filtration units with cleaning-in-place systems (CIP) enabling the cleaning of the membranes when desired (WO2014/044978). However, the main disadvantage of these systems is that they operate in closed loop(s) and thus require a momentary interruption of the production of injection water for the well(s). Thus typical CIPs do not allow the cleaning of the filtration membrane whilst injection water is being produced.

Filtration units with a hydraulic circuit connecting the permeate side of the filtration membrane to the feed side of said filtration membrane, thus allowing the recycling of a proportion of the permeate stream to the feed stream of said cross-flow filtration membrane, are also known in the art (WO2011/051666). The recycling of a portion of the permeate stream into the feed stream can be performed while the filtration system is being operated. This recycling loop reduces the concentration of foulants within the feed stream in a continuous way by diluting said feed stream with the clean permeate stream, and thus increasing the working life of the membrane.

Independently, it is known in the art to inject chemical products into the feed water stream upstream of the membrane. These chemical products can be biocides or acid or base cleaning products. For example, a biocide will typically be used for the prevention of micro-organisms development on the membrane (biofouling) while an acid or base product will be used as an antifouling membrane treatment against mineral (acid product) or organic (base product) clogging-up.

However, the amounts of chemical product injected to treat or prevent the fouling of the filtration membrane can be very high especially if injected continuously. This is a shortcoming from an economical point of view. It is also to be noted that it is a shortcoming for ecological reasons because of the increasing quantities of chemical products being finally discharged in the environment (either in the well or dispersed to sea). This is also a shortcoming regarding the needs for permanent and important monitoring device and program.

There is thus a need to find a more efficient way to prevent or substantially retard the clogging-up of the filters in the filtration units undersea whilst preserving the environment. The inventors have found an improved simple method to address this dilemma.

This new method increases the efficiency of the chemical treatment of the prior art whilst reducing the amounts of chemical products injected in the water filtration system.

Indeed, the inventors have identified that one of the problems of the chemical treatment is that the contact time between the membrane and the chemical product is too short. As a result, only a small proportion of the chemical product actually reacts with the membrane whilst a large proportion of unreacted chemical product passes into the permeate stream or stays in the retentate stream (as the filtration is of a cross-flow type). This proportion of unreacted chemical product is left unused in the water treatment system. The Inventors, instead of seeking for example a more potent chemical product, have developed a method for cleaning a filtration membrane wherein a proportion of the permeate stream or retentate stream containing unreacted chemical product is recovered and reinjected upstream of the filtration membrane.

SUMMARY OF THE INVENTION

A first object of the invention is a method for cleaning a filtration system under operation, said filtration system comprising:
- a cross-flow filtration membrane having:
  - a feed side fed with a feed stream,
  - a permeate side wherein a permeate stream is recovered and
  - a retentate side wherein a retentate stream is recovered,
- a permeate side hydraulic circuit Cp connecting the permeate side of said cross-flow filtration membrane to the feed side of said cross-flow filtration membrane, said hydraulic circuit Cp allowing the recycling of a proportion of the permeate stream to the feed side of said cross-flow filtration membrane, and/or
- a retentate side hydraulic circuit Cr connecting the retentate side of said cross-flow filtration membrane to the feed side of said cross-flow filtration membrane, said hydraulic circuit Cr allowing the recycling of a proportion of the retentate stream to the feed side of said cross-flow filtration membrane, said method comprising:
- injecting an amount of a chemical product into the filtration system which is under operation in the hydraulic circuit Cp or in the hydraulic circuit Cr or upstream of said cross-flow filtration membrane,
- setting the proportion of recycled permeate stream or recycled retentate stream collected in the hydraulic circuit Cp and/or Cr to enable the recycling of a significant amount of chemical product having passed through said cross-flow filtration membrane to the feed side of said cross-flow filtration membrane.

Another object of the present is a filtration system comprising:
- a cross-flow filtration membrane having:
  - a feed side fed with a feed stream,
  - a permeate side wherein a permeate stream is recovered and
  - a retentate side wherein a retentate stream is recovered,
- a hydraulic circuit Cp connecting the permeate side of said cross-flow filtration membrane to the feed side of said cross-flow filtration membrane, said hydraulic circuit Cp allowing the recycling of a proportion of the permeate stream to the feed stream of said cross-flow filtration membrane, and/or
- a hydraulic circuit Cr connecting the retentate side of said cross-flow filtration membrane to the feed side of said cross-flow filtration membrane, said hydraulic circuit Cr allowing the recycling of a proportion of the retentate stream to the feed side of said cross-flow filtration membrane,
- a reservoir containing a chemical product and said reservoir being connected to the hydraulic circuit Cp or the hydraulic circuit Cr or connected upstream of said cross-flow filtration membrane,
- a valve for setting the proportion of recycled permeate stream collected in the hydraulic circuit Cp, and/or
- a valve for setting the proportion of recycled retentate stream collected in the hydraulic circuit Cr.

In one embodiment, the cross-flow filtration membrane is a microfiltration membrane, an ultrafiltration membrane, a nanofiltration membrane or a reverse osmosis membrane.

In one embodiment, the cross-flow filtration membrane is a ceramic membrane or an organic membrane.

In one embodiment, the chemical product is a biocide, an acid, a base, a cleaning agent such as surfactant agent, a detergent, a complexation agent or a scale dissolver, or a mixture thereof.

In one embodiment, the proportion QC permeate of recycled permeate stream collected in the hydraulic circuit Cp is at least 10%, in particular at least 20%, in particular at least 30%, in particular at least 40%, in particular at least 50%, in particular at least 60%, in particular at least 70%, in particular at least 80%, in particular at least 90%.

In one embodiment, the proportion QC retentate of recycled retentate stream collected in the hydraulic circuit Cr is at least 10%, in particular at least 20%, in particular at least 30%, in particular at least 40%, in particular at least 50%, in particular at least 60%, in particular at least 70%, in particular at least 80%, in particular at least 90%.

In one embodiment, only a proportion of the permeate stream is recycled to the feed side of said cross-flow filtration membrane.

In one embodiment, both a proportion of the permeate stream and a proportion of the retentate stream are recycled to the feed side of said cross-flow filtration membrane.

In one embodiment, the filtration system of the invention further comprises an injector for injecting the chemical product to the hydraulic circuit Cp or the hydraulic circuit Cr or upstream of said cross-flow filtration membrane.

In one embodiment, the hydraulic circuit Cp and/or the hydraulic circuit Cr comprises a booster pump or an eductor.

In one embodiment, the filtration system under operation is located under water.

BRIEF DESCRIPTION OF THE DRAWINGS

The following example provides another illustration of the invention but without restraining to the scope of the invention.

FIG. 1 is a schematic representation of one embodiment of the filtration system of the invention.

DETAILED DESCRIPTION OF THE DRAWINGS

A first object of the invention is a method for cleaning a filtration system whilst it is under operation.

By the expression "filtration system" in the context of the present invention, it is meant an apparatus for producing low salinity water. Although the invention is particularly suitable for producing injection water for a subterranean hydrocarbon formation, it may be used in other fields, such as the production of potable water.

The filtration system of the invention comprises at least one cross-flow filtration membrane having a feed side fed with a feed stream, a permeate side from which a permeate stream is recovered and a retentate side from which a retentate stream is recovered.

By the term "cleaning" according to the present invention, it is meant removing from the membrane(s) of the filtration system any exogenous matter which is susceptible, before being removed, to impair the yield/efficiency of the filtration system.

By the expression "under operation", it is meant that the filtration system is working, i.e. water is being filtrated, and the permeate stream recovered from the permeate side of the membrane of the filtration system is not fully recycled to the feed side of the membrane, as it may be when cleaning-in-place systems are activated (closed loops).

The invention is particularly advantageous for a filtration system which is located under water, for instance on a natural seabed or an artificial buoyant seabed, at a great depth, in particular from 1,500 meters to 500 meters or at lower or higher depths.

Within the meaning of the present invention, a cross-filter filtration membrane is a membrane enabling the recovery of a permeate stream from one side of the membrane when the feed stream is passed tangentially to the surface of the other side of said membrane. Cross-filter filtration membranes do not include "dead-end" or "direct" filtration systems which operate in deposition mode.

The cross-filter filtration membrane may be chosen in a large range of porosities and thus includes microfiltration membranes, ultrafiltration membranes, nanofiltration membranes or reverse osmosis membranes.

The cross-filter filtration membrane with the smallest pores is reverse osmosis membrane (RO). It has a pore size from around 0.0001 µm to around 0.001 µm. RO involves reversal of the osmotic pressure of a solution in order to drive water away from dissolved molecules and thus enables the complete desalination of a highly saline water to produce pure water. RO generally operate at pressures of 29-83 bars.

A nanofiltration membrane (NF) functions similarly to reverse osmosis but is generally targeted to remove only divalent and larger ions. It has a pore size from around 0.001 µm to around 0.01 µm. The main part of monovalent ions such as sodium and chloride will pass through a NF. Due to the passage of monovalent ions, the net osmostic driving force required is less than RO. Operating pressures are lower and filtration rates are higher. NF typically operate in the range of 7-42 bars.

Ultrafiltration membranes (UF) do not follow an osmotic process. The pores are larger than RO or NF (from around 0.1 µm to around 0.01 µm). The method of rejection is primarily physical exclusion size. UF are specified by a molecular weight cut-off rating (MWCO). The range of MWCOs for UF is generally considered to be 1,000-1,000,000 Daltons. UF operate below 10 bars.

As with UF, microfiltration membranes (MF) operate at relatively low pressures. They have a pore size of from around 0.1 µm to around 5 µm.

The cross-flow filtration membrane may be a ceramic membrane or an organic membrane.

MF and UF may be constructed from a wide variety of materials, including cellulose acetate, polyvinylidene fluoride, polyacrylonitrile, polypropylene, polysulfone, polyethersulfone, or other polymers.

NF and RO are generally manufactured from cellulose acetate or polyamide materials.

The cross-filter filtration membrane can be provided in tubular, flat sheet, spiral wound or hollow fiber configurations, each of which provides certain advantages for specific process needs.

The spiral wound configuration is particularly advantageous as it maximizes membrane area into the least space. The basic unit of a spiral wound module is a sandwich of flat membrane sheets called a "leaf" wound around a central perforated tube. One leaf consists of two membrane sheets placed back-to-back and separated by a spacer called permeate carrier. Layers of the leaf are glued along three edges, while the unglued edge is sealed around the perforated central tube. The spacer provides the necessary gap between the other layers to separate the surfaces of adjacent membranes and promote turbulence of the feed stream. Feed water enters the spacer channels at the end of the spiral-wound element in a path parallel to the central tube. As feed water flows through the spacers, a portion passes through either of the two surrounding membrane layers and into the permeate carrier, leaving behind any dissolved and particulate matter that are rejected by the membrane. Filtered water in the permeate carrier travels spirally inward toward the central collector tube, while water in the feed spacer that does not passes through the membrane continues to flow across the membrane surface, becoming increasingly concentrated with rejected matter. This concentrate stream (retentate) exits the element parallel to the central tube through the opposite end from which the feed water enters.

The fouling of spiral wound membranes may be longitudinal fouling (between the grids of the spacer) or trans-membrane fouling (on the membrane surface).

The filtration system of the invention can comprise several cross-flow filtration membranes, arranged in series and/or in parallel, that may be identical or different. Hence, combinations of different types of the above mentioned membranes may be included the filtration system of the invention.

When the system includes several membranes, each element or embodiment described hereafter can be applied to all or part of these membranes.

According to the invention, the filtration system further comprises:
  a hydraulic circuit Cp connecting the permeate side of said cross-flow filtration membrane to the feed side of said cross-flow filtration membrane, and/or
  a hydraulic circuit Cr connecting the retentate side of said cross-flow filtration membrane to the feed side of said cross-flow filtration membrane.

The hydraulic circuit Cp and the hydraulic circuit Cr respectively allow the recycling of a proportion of the permeate stream and the recycling of a proportion of the retentate stream to the feed side of said cross-flow filtration membrane. In one embodiment, the filtration system of the invention comprises the hydraulic circuit Cp but the hydraulic circuit Cr is absent.

In another embodiment, the filtration system of the invention comprises the hydraulic circuit Cr but the hydraulic circuit Cp is absent.

In another embodiment, the filtration system of the invention comprises both the hydraulic circuit Cp and the hydraulic circuit Cr.

Under normal operation, i.e. outside any cleaning phase, a proportion of permeate stream may be continuously recycled to the feed side of the filtration membrane through hydraulic circuit Cp in order to improve the quality of the feed stream (less foulants) by diluting the feed stream with the permeate stream, and thus increasing the working life of the membrane.

Alternatively, there may be no permeate stream recycled to the feed side of the filtration membrane through hydraulic circuit Cp under normal operating conditions.

According to the invention, the hydraulic circuit Cp is used during a cleaning phase for recycling an amount of unreacted chemical product to the feed side of the filtration membrane. While only one injection of chemical product is done, the hydraulic circuit Cp enables part of the chemical product to pass through the membrane as many times as desired, preferably until it has completely reacted with the fouling that needs to be removed from the membrane. The present invention thus reduces the amount of unreacted chemical product and thus increases the efficiency of the cleaning phase while reducing the amounts of chemical products injected in the water filtration system.

To do so, an amount of chemical product is injected into the operating filtration system at a point of the filtration system that will enable the recycling of part of said chemical product to the feed side of said filtration membrane. The injection point of the chemical product can be located at various points of the filtration system.

In one embodiment, the chemical product is injected upstream of the filtration membrane of said filtration system.

In one embodiment, the chemical product is injected upstream of the filtration membrane of said filtration system and downstream of pre-filters such as microfiltration membranes or ultrafiltration membranes.

In one embodiment, the chemical product is injected upstream of the filtration membrane of said filtration system and upstream of pre-filters such as microfiltration membranes or ultrafiltration membranes.

In another embodiment, the chemical product is injected in the hydraulic circuit Cp.

In another embodiment, the chemical product is injected in the hydraulic circuit Cr.

The amount of chemical product recycled to the feed side of the filtration membrane will depend on the proportion of permeate stream or retentate stream recycled to the feed side of the filtration membrane. This amount can be controlled by setting the proportion of recycled permeate stream or recycled retentate stream collected in the hydraulic circuit Cp and/or Cr.

The level of fouling of a filtration membrane is generally monitored by measuring the difference in pressure between the feed side and the permeate side of the membrane (ΔP membrane) and/or by measuring the difference in pressure between the feed side and the retentate side of the membrane (ΔP longitudinal). ΔP longitudinal and ΔP membrane are measured when the membrane is clean (ΔP longitudinal initial and ΔP membrane initial). As the feed stream is being filtrated by the membrane, the membrane is being progressively fouled. As a result, ΔP longitudinal and ΔP membrane progressively increase. It is considered that a cleaning of the membrane should be done when at least one of ΔP longitudinal and ΔP membrane reaches a predetermined value, which is typically 10% or 15% higher than ΔP longitudinal initial or ΔP membrane initial.

According to the invention, the triggering of the injection of the chemical product may be performed at this time, i.e. when at least one of ΔP longitudinal and ΔP membrane reaches this predetermined value. The chemical product may also be injected preventively, at a predetermined frequency, for instance on a weekly or biweekly basis. The time of injection of the chemical product determines the beginning of the cleaning phase.

According to the invention, during the whole cleaning phase, the proportion of recycled permeate stream or recycled retentate stream collected in the hydraulic circuit Cp and/or Cr is set so as to enable the recycling of a significant amount of unreacted chemical product having passed through said cross-flow filtration membrane to the feed side of said cross-flow filtration membrane.

$Q_{C\ permeate}$ is the proportion of permeate stream recycled to the feed side of the filtration membrane during the cleaning phase.

$Q_{C\ retentate}$ is the proportion of retentate stream recycled to the feed side of the filtration membrane during the cleaning phase.

In one embodiment, $Q_{C\ permeate}$ is at least 10%, in particular at least 20%, in particular at least 30%, in particular at least 40%, in particular at least 50%, in particular at least 60%, in particular at least 70%, in particular at least 80%, in particular at least 90%.

In one embodiment, $Q_{C\ retentate}$ is 0%, i.e. the chemical product is recycled only through the hydraulic circuit Cp. Hence, only a proportion of the permeate stream is recycled to the feed side of said cross-flow filtration membrane.

In another embodiment, $Q_{C\ retentate}$ is ≠0%, i.e. the chemical product is recycled both through the hydraulic circuit Cp and the hydraulic circuit Cr. Hence, both a proportion of the permeate stream and a proportion of the retentate stream are recycled to the feed side of said cross-flow filtration membrane.

In one embodiment, $Q_{C\ retentate}$ is at least 10%, in particular at least 20%, in particular at least 30%, in particular at least 40%, in particular at least 50%, in particular at least 60%, in particular at least 70%, in particular at least 80%, in particular at least 90%.

The proportions $Q_{C\ permeate}$ and $Q_{C\ retentate}$ are expressed relatively to the flow rate of the respective permeate or retentate stream.

In one embodiment, a proportion of permeate stream is continuously recycled to the feed side of the filtration membrane through hydraulic circuit Cp under normal operating conditions, i.e. outside the cleaning phase. In that case, $Q_{R\ permeate}$ is the proportion of permeate stream continuously recycled to the feed side of the filtration membrane.

In one embodiment, $Q_{C\ permeate}$ is equal to $Q_{R\ permeate}$.

In another embodiment, $Q_{C\ permeate}$ is higher than $Q_{R\ permeate}$.

As for the level of fouling, the level of cleaning of the filtration membrane can be monitored by measuring the trans-membrane pressure (TMP=ΔP membrane) and/or the ΔP longitudinal. It is considered that the cleaning phase is finished when either ΔP longitudinal or ΔP membrane return to pre-determined values, which may or may not be equal to ΔP longitudinal initial and ΔP membrane initial respectively. In this case, the recycling of the retentate stream to the feed side of the filtration membrane and the recycling of the permeate stream to the feed side of the filtration membrane for cleaning purposes are stopped.

By the expression "a significant amount of unreacted chemical product", it is meant that said unreacted chemical product is present in the permeate stream or in the retentate stream at a concentration of at least 70% of initial concentration, in particular at least 50% of initial concentration, in particular at least 30% of initial concentration.

The chemical product injected into the filtration system may be any chemical product that is able to restore the trans-membrane pressure (TMP=ΔP membrane) and/or the ΔP longitudinal to its clean level.

A variety of chemical products may be injected into the filtration system, depending on the form of fouling that is to be removed from the membrane. The chemical product includes for instance a biocide, an acid, a base, a cleaning agent such as surfactant agent, a detergent, a complexation agent or a scale dissolver, or a mixture thereof.

By the term "biocide", it is meant in the context of the present invention any chemical compound able to kill or to disable living organisms, such as bacteria, fungi, algae, or even small aquatic animals. The biocide is preferably chosen among chlorine compounds, such as sodium hypochlorite or DBNPA (2,2-dibromo-3-nitrilopropionamide) which is a non-oxidizing biocide. Since polyamide membranes have very limited tolerance from strong oxidants, DBNPA is particularly advantageous for cleaning NF and RO membranes manufactured with polyamide.

Acids are used to dissolve inorganic scaling. As it is commonly known in the art, the term "acid" refers to any chemical compound which will decrease the pH of the water. It may be an organic or inorganic acid. Such acids may be for example citric acid and/or hydrochloric acid, at any concentrations enabling the cleaning effect. These concentrations may be comprised between 0.1% and 10% per weight of the injected solution, preferably between 0.5% and 5% per weight of the injected solution, more preferably between 1% and 4% per weight of the injected solution.

Bases are used to dissolve organic materials, such as fragments of algae. As it is commonly known in the art, the term "base" refers to any chemical compound which will increase the pH of the water. It may be organic or inorganic. It can be selected from conventional compounds known to those skilled in the art. The bases are specially developed to remove organic colonization or microbial residues. In the context of the present invention, such bases may be for example KOH, NaOH or LiOH, at any concentrations enabling the cleaning effect. These concentrations may be comprised between 0.1% and 10% per weight of the injected solution, preferably between 0.5% and 5% per weight of the injected solution, more preferably between 1% and 4% per weight of the injected solution.

Cleaning agents are used to remove organic or particulate foulants, particularly those that are difficult to dissolve. Such examples of cleaning agents are surfactant agents, detergents, complexation agents or scale dissolvers.

The feed stream is preferably seawater, but may also be aquifer water, river or lake water, as well as production water, domestic or industrial wastewater, i.e. any water which requires a treatment in order to obtain water which has a required quality, in particular a quality compatible with injection into the underground formation.

A second object of the invention is a filtration system that may be used to perform the method of the invention as described above. As such, the features defined above in relation with the first object of the invention (method) may also apply to the second object of the invention.

The filtration system of the invention comprises a cross-flow filtration membrane having:
a feed side,
a permeate side and
a retentate side.

Under operating conditions, the feed side of the membrane is fed with a feed stream. As the feed stream is being filtrated by the membrane, a permeate stream is recovered at the permeate side of the membrane and a retentate is recovered at the retentate side of the membrane.

According to the invention, the filtration system further comprises:
a hydraulic circuit Cp connecting the permeate side of said cross-flow filtration membrane to the feed side of said cross-flow filtration membrane, said hydraulic circuit Cp allowing the recycling of a proportion of the permeate stream to the feed side of said cross-flow filtration membrane, and/or
a hydraulic circuit Cr connecting the retentate side of said cross-flow filtration membrane to the feed side of said cross-flow filtration membrane, said hydraulic circuit Cr allowing the recycling of a proportion of the retentate stream to the feed side of said cross-flow filtration membrane,
a reservoir containing a chemical product and said reservoir being connected to the hydraulic circuit Cp or the hydraulic circuit Cr or connected upstream of said cross-flow filtration membrane,
a valve for setting the proportion of recycled permeate stream collected in the hydraulic circuit Cp, and/or
a valve for setting the proportion of recycled retentate stream collected in the hydraulic circuit Cr.

The hydraulic circuit Cp and the hydraulic circuit Cr are configured to divert a portion of the permeate stream to the feed side of the filtration membrane.

Typically, the filtration system comprises a feed pump for passing the feed stream through the cross-flow filtration membrane.

When the filtration system is used to produce water injection for a subterranean hydrocarbon formation, it typically further comprises a water injection pump for injecting the filtered water into the hydrocarbon formation.

In one embodiment, the hydraulic circuit Cp connects downstream of the water injection pump with the feed side of the filtration membrane.

In one embodiment, the hydraulic circuit Cp connects the permeate side of the filtration membrane with upstream of the feed pump.

In one embodiment, the hydraulic circuit Cp comprises a booster pump or an eductor.

In that case, the hydraulic circuit Cp can connect the permeate side of the filtration membrane (upstream of the injection pump) with the feed side of said filtration membrane.

A booster pump is a centrifugal pump used to circulate the fluid. The pump differential pressure compensates the pressure loss through the system to circulate the fluid in the loop.

An eductor (also known as educator jet-pump) is a passive equipment based on a ventury type device. The driving force to circulate the water through the circuit is provided by a pressurized water flow source (motive). Driving water enables to suck the circuit water and make it circulate.

In one embodiment, the hydraulic circuit Cr connects the retentate side of the filtration membrane with upstream of the feed pump.

In one embodiment, the hydraulic circuit Cr comprises a booster pump or an eductor. In that case, the hydraulic circuit Cr can connect the retentate side of the filtration membrane (upstream of the injection pump) with the feed side of said filtration membrane.

The hydraulic circuit Cp of the filtration system of the invention is provided with a valve which allows setting the proportion of permeate stream collected in the hydraulic circuit Cp that is recycled to the feed side of the membrane.

The hydraulic circuit Cr of the filtration system of the invention is provided with a valve which allows setting the proportion of retentate stream collected in the hydraulic circuit Cr that is recycled to the feed side of the membrane.

Any type of valve can be used, preferably globe valve, butterfly valve, fixed cone valve, gate valve, needle valve, pinch valve, ball valve, plug valve, spherical valve, chemical injection throttle valve (CITV).

If the filtration system is a subsea filtration system, the valve is preferably an electrical valve which can be remotely controlled.

In one embodiment, the hydraulic circuit Cp and the hydraulic circuit Cr of the filtration system of the invention are also each provided with a pump that conveys respectively in the hydraulic circuit Cp and the hydraulic circuit Cr a portion of the permeate stream and a portion of the retentate stream from respectively the permeate side and the retentate side of the membrane to its feed side.

In one embodiment, the filtration system of the invention further comprises a mixing device allowing the mixing of the recycled permeate or the recycled retentate with the feed stream. Any type of mixing device can be used, particularly static mixers.

In a preferred embodiment, the filtration system of the invention further comprises pressure differential transmitters or pressure transmitters. These transmitters can be located on each individual membrane and/or on the global membrane system as membranes can be used in series and or in parallel.

The chemical product is stored in a reservoir which is connected to the hydraulic circuit Cp or to the hydraulic circuit Cr or connected at any point upstream of said cross-flow filtration membrane.

The term "connected" means that chemical product stored in the reservoir can be transferred from the reservoir to the above mentioned parts of the system.

In one embodiment, the reservoir is connected to the filtration system so that the chemical product is injected upstream of the filtration membrane of said filtration system.

In one embodiment, the reservoir is connected to the filtration system so that the chemical product is injected upstream of the filtration membrane of said filtration system and downstream of pre-filters such as microfiltration membranes or ultrafiltration membranes.

In one embodiment, the reservoir is connected to the filtration system so that the chemical product is injected upstream of the filtration membrane of said filtration system and upstream of pre-filters such as microfiltration membranes or ultrafiltration membranes.

In another embodiment, the reservoir is connected to the filtration system so that the chemical product is injected in the hydraulic circuit Cp.

In another embodiment, the reservoir is connected to the filtration system so that the chemical product is injected in the hydraulic circuit Cr.

When the filtration system is a subsea filtration system, the reservoir of the chemical product may be a subsea storage reservoir located inside the filtration system or it may be located outside the filtration system on a topside facility and be connected to the filtration system with an umbilical pipe or a chemical line The reservoir can be any reservoir suitable for containing an amount of chemical product and for injecting a dose of said chemical product into the water flow of the filtration system. The reservoir may be rigid or flexible. There is no limitation regarding the form of the chemical product contained in the reservoir: it is preferably in liquid form, but it can also be in solid form, such as a powder or a tablet, as long as it is injectable.

In one embodiment, the filtration system comprises an injector for injecting the chemical product to the hydraulic circuit Cp or the hydraulic circuit Cr or upstream of said cross-flow filtration membrane, either in batch or continuously, such as a pump or an eductor.

Alternatively, the reservoir may be pressurized and provided with a valve for controlling the opening and the closing of the reservoir. The chemical product can be injected into the filtration system, either in batch or continuously, simply by opening the valve, either in batch or continuously.

The reservoir is preferably provided with a dosing means, such as a Venturi dosing device, a dosing pump, or a valve, in particular a chemical injection metering valve.

DETAILED DESCRIPTION OF THE FIGURES

The filtration system 1 includes in the direction of flow a strainer 2, a feed pump 3, a coarse filter 4, a nanofiltration membrane 5 and a water injection pump 6. The flow of water (feed stream) enters the filtration system 1 via the strainer 2, which holds back large diameter solid elements, thus avoiding the filtration system 1 quickly becoming blocked by large elements. The strainer 2 and feed pump 3 may form part of a mobile water intake, for example by means of a telescopic system which enables the site of the water intake to be varied without modifying the location of the filtration system itself. In particular, a telescopic system or a rewinder can allow the level of the water intake to be moved. The coarse filter 4 is a filter that is able to stop relatively large-sized solid particles, particularly above 100 μm, 50 μm or 20 μm.

The filtration system 1 further comprises a hydraulic circuit Cp 8 which connects downstream of the water injection pump 6 to the feed side of said membrane 5 and a hydraulic circuit Cr 10 which connects the retentate side of the membrane 5 to upstream of the feed pump 3. Alternatively, the filtration system 1 can comprise a hydraulic circuit Cp 8' (represented with dotted lines) comprising a booster pump 12 and connecting the permeate side of the membrane 5 to the feed side of said membrane 5. Still alternatively, the filtration system 1 can comprise a hydraulic circuit Cr 10' (represented with dotted lines) comprising a booster pump 13 and connecting the retentate side of the membrane 5 to the feed side of the membrane 5. The hydraulic circuits Cp 8 and 8' are respectively provided with valves 7 and 7' which enable setting the proportion of permeate which is recycled to the feed side of the membrane 5. Similarly, the hydraulic circuits Cr 10 and 10' are provided with valves 9 and 9' which enable setting the proportion of retentate which is recycled respectively upstream of the feed pump 3 and to the feed side of the membrane 5.

A reservoir 11 containing a chemical product is connected to the feed stream upstream of the membrane 5. The reservoir 11 can be connected at any point between the strainer 2 and the membrane 5. The filtration system 1 may be provided with an injector for injecting the chemical product from reservoir to the hydraulic circuit (not represented in FIG. 1). Alternatively, the reservoir 11 could be connected at any point on the hydraulic circuit Cp 8 or at any point of the hydraulic circuit Cr 10. The water injection pump 6 conveys the permeate stream to a well.

When the filtration system 1 is under operation (i.e. outside any cleaning phase), the feed stream passes through filters of increasing selectivity along the water flow direction, namely the strainer 2, the coarse filter 4 and the nanofiltration membrane 5. A permeate stream suitable for water injection in well is recovered from the permeate side of membrane 5, while a retentate stream is recovered from the retentate side of membrane 5.

The cleaning phase is operated as follows:

The proportion of the permeate stream recycled through the hydraulic circuit Cp 8 ($Q_{C\ permeate}$) is set by acting on valve 7, for instance up to a value around 50% of the permeate stream, A dose of chemical product is injected into the feed stream from the reservoir 11, When ΔP longitudinal and/or ΔP membrane return to their clean level, the flow through hydraulic circuit Cp 8 is decreased to the initial value by acting on valve 7.

For a given dose of chemical product, the more $Q_{C\ permeate}$ is increased, the more unreacted chemical product is recycled to the feed side of the membrane 5, and as a result the more ΔP longitudinal and/or ΔP membrane are decreased. If said given dose of chemical product is not sufficient to make longitudinal and/or ΔP membrane return to their clean level, a second dose of chemical product may be injected to the filtration system. If necessary, several injections may be performed until longitudinal and/or ΔP membrane return to their clean level. $Q_{C\ permeate}$ may be adjusted depending on the dose of chemical product, the nature of the chemical product and the minimum flow rate of permeate required for injection to the well.

The ΔP membrane and ΔP longitudinal are continuously measured; the evolutions of these ΔP are the driving parameter for launching a cleaning phase. The cleaning parameters (percentage of recirculation of permeate and/or retentate, chemical type and dosage) cannot be calculated, it will be adapted to each cases and determined empirically.

When a dose of chemical product is injected into the feed stream from the reservoir 11, unreacted chemical product can be found not only in the permeate stream but also in the retentate stream.

Therefore, during all or part of this cleaning phase, a proportion of the retentate stream may be also collected in the hydraulic circuit Cr 10, for instance to around 25% of the retentate stream ($Q_{C\ retentate}$) by acting on valve 9 and be recycled to the feed side of the membrane 5. By doing so, part of the unreacted chemical product that is present in the retentate is recycled to the feed side of said membrane 5. When ΔP longitudinal and/or ΔP membrane return to their clean level, the valve 10 is closed so that $Q_{C\ retentate}$ is decreased to 0% vol. of the feed stream.

For a given dose of chemical product, the more $Q_{C\ retentate}$ is increased, the more unreacted chemical product is recycled to the feed side of the membrane 5, and as a result the more ΔP longitudinal and/or ΔP membrane are decreased. $Q_{C\ retentate}$ may be adjusted depending on the dose of chemical product, the nature of the chemical product, $Q_{C\ permeate}$ and the minimum flow rate of permeate required for injection to the well.

Alternatively, under normal operation a proportion of permeate stream can be continuously recycled to the feed side of the membrane 5 through the hydraulic circuit Cp 8 in order to improve the quality of the feed stream. This proportion ($Q_{R\ permeate}$) can be for instance around 30% of the permeate stream. In that case, the cleaning phase is operated by setting $Q_{C\ permeate}$ by acting on valve 7 up to a value which is higher than $Q_{R\ permeate}$, for instance up to a value around 50% of the permeate stream. Then, the same steps as those described above are performed, namely:

A dose of chemical product is injected into the feed stream from the reservoir 11, and When ΔP longitudinal and/or ΔP membrane return to their clean level, the flow through hydraulic circuit Cp 8 is decreased to the initial value ($Q_{R\ permeate}$) by acting on valve 7.

The embodiments described herein are merely exemplary and various modifications may be made thereto without departing from the scope of the invention.

The invention claimed is:

1. A method for cleaning a filtration system under operation, said filtration system comprising:
    a cross-flow filtration membrane having:
        a feed side fed with a feed stream,
        a permeate side wherein a permeate stream is recovered and
        a retentate side wherein a retentate stream is recovered,
    a hydraulic circuit Cp being provided with a valve connecting the permeate side of said cross-flow filtration membrane to the feed side of said cross-flow filtration membrane, said hydraulic circuit Cp allowing recycling of a proportion of the permeate stream to the feed side of said cross-flow filtration membrane,
said method comprising:
    measuring a difference in pressure between the feed side and the permeate side of the membrane, ΔP membrane, and/or measuring a difference in pressure between the feed side and the retentate side of the membrane, ΔP longitudinal,
    injecting an amount of a chemical product into the filtration system which is under operation directly in the hydraulic circuit Cp when at least one of ΔP membrane and ΔP longitudinal reaches a predetermined value which is 10% higher than ΔP longitudinal initial or ΔP membrane initial,
    setting a proportion of permeate stream collected in the hydraulic circuit Cp that is recycled to the feed side of said cross-flow filtration membrane with the valve to enable recycling of a significant amount of unreacted chemical product passing through said cross-flow filtration membrane, the significant amount of unreacted chemical product meaning that said unreacted chemical product is present in the recycled permeate stream at a concentration of at least 70% of initial concentration of chemical product injected directly into the hydraulic circuit Cp.

2. The method according to claim 1, wherein the cross-flow filtration membrane is a microfiltration membrane, an ultrafiltration membrane, a nanofiltration membrane or a reverse osmosis membrane.

3. The method according to claim 1, wherein the cross-flow filtration membrane is a ceramic membrane or an organic membrane.

4. The method according to claim 1, wherein the chemical product is a biocide, an acid, a base, a cleaning agent such as surfactant agent, a detergent, a complexation agent or a scale dissolver, or a mixture thereof.

5. The method according to claim 1, wherein the proportion of permeate stream collected in the hydraulic circuit Cp that is recycled to the feed side of the filtration a membrane is at least 10% relative to the flow rate of permeate stream collected ire the hydraulic circuit Cp.

6. The method according to claim 1, wherein the filtration system under operation is located under water.

* * * * *